United States Patent
Ma et al.

(10) Patent No.: US 10,361,478 B2
(45) Date of Patent: Jul. 23, 2019

(54) HOUSING, METHOD FOR MANUFACTURING HOUSING, AND MOBILE TERMINAL

(71) Applicant: Guangdong Oppo Mobile Telecommunications Corp., Ltd., Dongguan, Guangdong (CN)

(72) Inventors: Jun Ma, Guangdong (CN); Guangming Yang, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/677,607

(22) Filed: Aug. 15, 2017

(65) Prior Publication Data
US 2018/0053989 A1    Feb. 22, 2018

(30) Foreign Application Priority Data
Aug. 16, 2016    (CN) .......................... 2016 1 0679739

(51) Int. Cl.
  *H01Q 1/24*    (2006.01)
  *H04M 1/02*    (2006.01)
  *B23B 1/00*    (2006.01)

(52) U.S. Cl.
  CPC .............. *H01Q 1/243* (2013.01); *B23B 1/00* (2013.01); *H04M 1/0202* (2013.01); *H04M 1/0283* (2013.01)

(58) Field of Classification Search
  CPC ........ H04M 1/0249; B32B 7/12; B32B 27/06; B32B 37/12; B32B 38/145; B32B 2309/105; H05K 5/02; H05K 5/04
  See application file for complete search history.

(56) References Cited

U.S. PATENT DOCUMENTS

| 6,337,662 B1 * | 1/2002 | Cassel .................... H01Q 1/243 343/700 MS |
| 7,053,848 B2 * | 5/2006 | Shoji ...................... H01Q 1/243 343/702 |

(Continued)

FOREIGN PATENT DOCUMENTS

| CN | 104821438 A | 8/2015 |
| CN | 105517389 A | 4/2016 |

(Continued)

OTHER PUBLICATIONS

Extended European Search Report issued in corresponding European application No. 17185354.2 dated Jan. 2, 2018.

(Continued)

*Primary Examiner* — Pablo N Tran
(74) *Attorney, Agent, or Firm* — Young Basile Hanlon & MacFarlane, P.C.

(57) ABSTRACT

A housing, a method for manufacturing the housing, and a mobile terminal are provided. The method includes: manufacturing a cover body made of shielding material and having a first surface and a second surface opposite to the first surface; defining at least one slot in the cover body, wherein the at least one slot has a depth less than a thickness of the cover body and has an opening in the first surface and a bottom opposite to the opening; filling the at least one slot with first non-shielding material; and removing at least a portion of the cover body which is located between the bottom of the at least one slot and a portion of the second surface opposite to the bottom of the at least one slot, such that the at least one slot penetrates through the cover body in the thickness direction of the cover body.

12 Claims, 11 Drawing Sheets

(56) References Cited

U.S. PATENT DOCUMENTS

| | | | |
|---|---|---|---|
| 9,716,307 B2* | 7/2017 | Tsai | H01Q 13/106 |
| 9,904,077 B2* | 2/2018 | Park | B82Y 20/00 |
| 2004/0145521 A1* | 7/2004 | Hebron | H01Q 1/243 |
| | | | 343/700 MS |
| 2006/0055606 A1* | 3/2006 | Boyle | H01Q 1/243 |
| | | | 343/702 |
| 2010/0097276 A1* | 4/2010 | Lin | B44C 5/0453 |
| | | | 343/702 |
| 2012/0009884 A1* | 1/2012 | Rao | H01Q 1/243 |
| | | | 455/73 |
| 2012/0268343 A1* | 10/2012 | Yanagi | H01Q 1/526 |
| | | | 343/872 |
| 2014/0015724 A1* | 1/2014 | Bungo | H01Q 13/10 |
| | | | 343/767 |
| 2015/0222009 A1 | 8/2015 | Asou et al. | |
| 2016/0072932 A1 | 3/2016 | Hill et al. | |
| 2016/0191681 A1 | 6/2016 | Han et al. | |

FOREIGN PATENT DOCUMENTS

| | | |
|---|---|---|
| CN | 105530786 A | 4/2016 |
| CN | 105657101 A | 6/2016 |
| CN | 105773905 A | 7/2016 |
| CN | 105813422 A | 7/2016 |
| CN | 105846054 A | 8/2016 |
| CN | 105847495 A | 8/2016 |
| CN | 205430838 U | 8/2016 |
| CN | 106028724 A | 10/2016 |
| EP | 2781987 A1 | 9/2014 |
| WO | WO2011076582 A1 | 6/2011 |

OTHER PUBLICATIONS

International Search Report issued in corresponding International application No. PCT/CN2017/097456 dated Oct 27, 2017.

* cited by examiner

HOUSING, METHOD FOR MANUFACTURING HOUSING, AND MOBILE TERMINAL

CROSS-REFERENCE TO RELATED APPLICATION(S)

The present application claims priority to Chinese Patent Application No. 201610679739.9 filed on Aug. 16, 2016, the content of which is hereby incorporated by reference in its entirety.

TECHNICAL FIELD

The present disclosure relates to electronic devices, and more particularly, to a housing, a method for manufacturing the housing, and a mobile terminal.

BACKGROUND

With development of science and technology as well as market demand, a mobile phone having a metal housing is becoming more and more popular. The mobile phone having the metal housing has a beautiful appearance, but the metal housing may block radio signals from an antenna to some extent.

Currently, a gap area is defined in the metal housing by computer numerical control (CNC) machining, so as to enable transmission of the radio signals. Generally, a slot is defined in the metal housing by CNC machining, and then plastic is injected into the slot. However, the injecting pressure may be too great when injecting the plastic, such that the slot is pressed, deformed, and thus has a non-uniform width, which destroying appearance unity of the housing.

BRIEF DESCRIPTION OF THE DRAWINGS

In order to more clearly describe technical solutions according to implementations of the present disclosure, accompanying drawings used in the implementations will be briefly introduced hereinafter. Apparently, the accompanying drawings described hereinafter show some implementations of the present disclosure, and persons skilled in the art may also derive other drawings from these accompanying drawings without creative efforts.

DETAILED DESCRIPTION

A clear, complete description for the technical solutions of implementations of the present disclosure is provided below, in conjunction with the drawings in the implementations of the present disclosure. Apparently, the implementations to be described are a part, rather than all of implementations of the present disclosure. Other implementations obtained by persons skilled in the art from the implementations given herein without creative efforts should all fall within the protection scope of the present disclosure.

According to one aspect of the present disclosure, a method for manufacturing a housing is provided.

Figure 1:
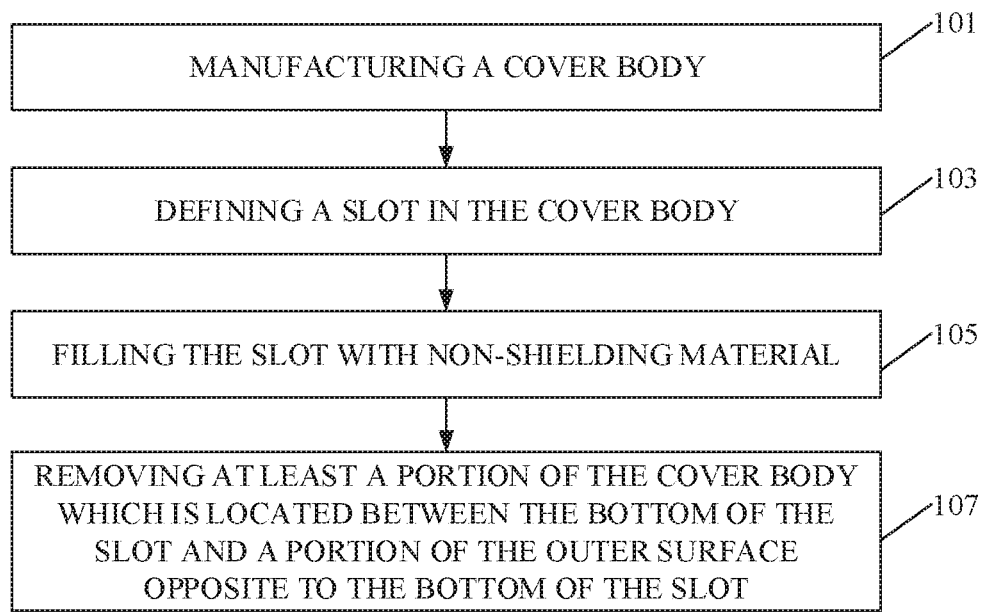
FIG. 1 is a flowchart of a method for manufacturing a housing according to an implementation of the present disclosure.

FIG. 1 illustrates a flowchart of a method for manufacturing a housing according to an implementation of the present disclosure. The housing may serve as a back cover of a mobile terminal. As illustrated in FIG. 1, the method according to the implementation of the present disclosure may begin at block 101.

At block 101: a cover body is manufactured. The cover body is made of shielding material.

In one implementation of the present disclosure, the cover body may be made according to actual requirements. The cover body includes a back plate and four side walls surrounding the back plate. Two of the four side walls are a pair of oppositely disposed long side walls, while the other two are a pair of oppositely disposed short side walls. The four side walls are mainly used for being connected to a front cover of the mobile terminal. The cover body has a first surface facing the interior of the mobile terminal and a second surface disposed oppositely to the first surface. The second surface is exposed outside and can be directly touched by a user. For convenient description, the first surface is referred to as an inner surface, while the second surface is referred to as an outer surface. Naturally, in other implementations, the cover body may include a back plate with snaps disposed on the periphery of the back plate, such that the back plate can be connected to the front cover of the mobile terminal by a snap-fit.

It will be appreciated that material forming the cover body may be metal. In one implementation of the present disclosure, the material of the cover body is aluminum or aluminum alloy which facilitates shaping the cover body.

Figure 2:
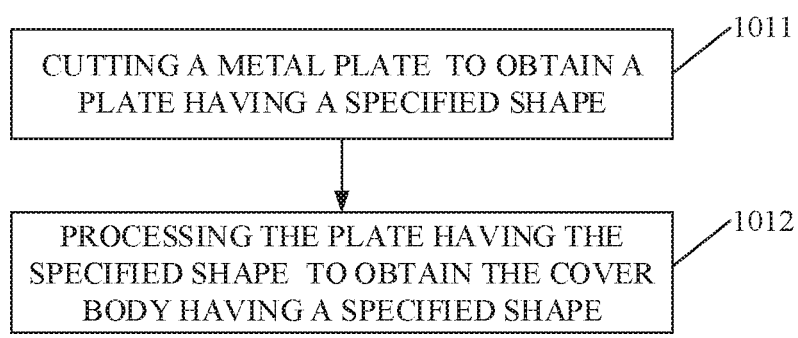
FIG. 2 is a flowchart of manufacturing a cover body.

FIG. 2 is a flowchart of manufacturing the cover body. As illustrated in FIG. 2, the flowchart of manufacturing the cover body may begin at block 1011.

At block 1011: a metal plate is cut to obtain a plate having a specified shape.

In one implementation of the present disclosure, a large plate made of aluminum is cut by a cutting tool, so as to obtain the plate having the specified shape.

At block 1012: the plate having the specified shape is processed to obtain the cover body having a specified shape.

In one implementation of the present disclosure, the plate having the specified shape is processed with a CNC lathe, so as to obtain the cover body having the specified shape.

In one implementation of the present disclosure, the plate having the specified shape is placed into a mold, and is pressed. It will be appreciated that the plate having the specified shape may be pressed once or many times. Then the plate having the specified shape is processed with the CNC lathe, so as to obtain the cover body having the specified shape.

As illustrated in FIG. 1, at block 103: a slot is defined in the cover body.

In one implementation of the present disclosure, the slot is defined in the cover body by cutting the inner surface of the cover body along a specified route. The slot has a depth less than the whole thickness of the cover body, and thus does not penetrate through the cover body. That is to say, the slot has an opening in the inner surface and a bottom opposite to the opening. The opening of the slot is at the inner surface and is used for receiving non-shielding material subsequently, while the bottom renders the slot robust, such that the slot is not readily deformed during subsequent filling to ensure the appearance unity of the housing.

It will be appreciated that the specified route corresponds to the desired shape of the slot. For example, if the slot is straight, the corresponding specified route is also straight; if the slot is curved, the corresponding specified route is also curved. It will also be appreciated that the slot in this implementation has a rectangular cross-section.

It will be appreciated that the specified route extends from one side wall to another opposite side wall via the back plate, i.e. the slot is located in the two opposite side walls and the back plate. In one implementation of the present disclosure, the slot is defined in the two long side walls and the back plate. Naturally, in other implementations, the specified route extends from one side of the back plate to the other side of the back plate, i.e. the slot is merely defined in the back plate and does not extend to the side walls located on the sides of the back plate.

It will be appreciated that the number of the slots is not limited, and may be one or more. Correspondingly, the number of the specified routes is also the same as the number of the slots. In one implementation, the number of the slots is three, and the three slots are arranged along the longitudinal direction of the cover body, and the distances between two adjacent slots are the same, i.e., the three slots are arranged in the cover body with uniform gaps therebetween.

Figure 3:
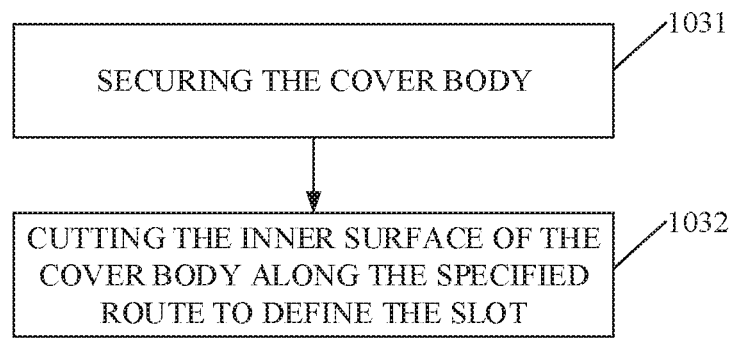
FIG. 3 is a flowchart of defining a slot in the cover body.

FIG. 3 is a flowchart of defining the slot in the cover body. As illustrated in FIG. 3, the flowchart of defining the slot in the cover body may begin at block 1031.

At block 1031: the cover body is secured.

At block 1032: the inner surface of the cover body is cut along the specified route to define the slot.

In one implementation of the present disclosure, the cover body is secured to the CNC lathe by means of screwing or pressing by a cylinder. In one implementation of the present disclosure, the cover body is vertical when it is secured to the CNC lathe, that is to say, the back plate of the cover body is perpendicular to the platform of the CNC lathe. Since the slot is located in the two opposite side walls and the back plate of the cover body, the inner surface of the cover body is cut from one side wall to the other opposite side wall via the back plate by a T-shaped tool. The T-shaped tool is used to ensure that the slot is defined without stopping, thereby reducing machining time. Naturally, in other implementations, the inner surface of the cover body is cut three times by a common tool, so as to define the slot. At first, one side wall is cut to define a portion of the slot located therein, then the back plate is cut to define another portion of the slot located therein, and finally another opposite side wall is cut to define the remaining portion of the slot located therein.

It will be appreciated that the slot has a width tolerance ranged from −0.3 mm to 0.3 mm, which facilitates radiation of radio frequency signals from an antenna.

As illustrated in FIG. 1, at block 105: the slot is filled with non-shielding material.

In one implementation of the present disclosure, the non-shielding material may be the material allowing the radio frequency signals from the antenna to pass therethrough.

Figure 4:
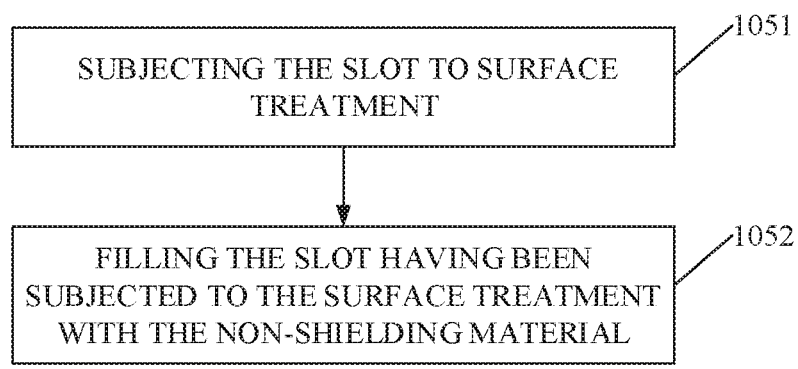
FIG. 4 is a flowchart of filling the slot with non-shielding material.

FIG. 4 is a flowchart of filling the slot with the non-shielding material. As illustrated in FIG. 4, the flowchart of filling the slot with the non-shielding material may begin at block 1051.

At block 1051: the slot is subjected to surface treatment.

At block 1052: the slot having been subjected to the surface treatment is filled with the non-shielding material.

In one implementation of the present disclosure, when the cover body is made of aluminum or aluminum alloy, the slot in the cover body may be subjected to a T-process, such that the inner side, including the bottom, of the slot can be readily combined with the non-shielding material subsequently. In this case, the non-shielding material may be plastic and the slot is then filled by injecting the plastic. Naturally, in other implementations, the non-shielding material may be gel and the slot is filled with gel by a dispenser. Naturally, in some implementations, the non-shielding material may be a mixture of the plastic and the gel.

As illustrated in FIG. 1, at block 107: at least a portion of the cover body which is located between the bottom of the slot and a portion of the outer surface opposite to the bottom of the slot is removed.

Since the slot does not penetrate through the cover body at this time, the bottom of the slot is still metallic and disadvantageous to the radio frequency signals from the antenna passing through the cover body. Hence, the cover body is cut by a predetermined thickness starting from the second surface. The predetermined thickness is less than the whole thickness of the cover body, but the sum of the depth of the slot and the predetermined thickness is greater than or equal to the whole thickness of the cover body such that the slot penetrates through the cover body in the thickness direction of the cover body, and only the non-shielding material is received in the slot, which facilitates the radio frequency signals from the antenna passing therethrough.

It will be appreciated that, the cover body may be cut by the predetermined thickness starting from the second surface by means of milling, such that the slot penetrates through the cover body. In one implementation of the present disclosure, the bottom of the slot is closer to the outer surface of the cover body, and the cover body is cut by the predetermined thickness starting from the second surface by means of milling until the bottom of the slot becomes another opening, i.e., the slot penetrates through the cover body. Naturally, in other implementations, the cover body may be cut by the predetermined thickness by means of laser engraving such that the slot penetrates through the cover body.

Naturally, in other implementations, only a portion of the outer surface opposite to the slot may be cut, and a cutting depth is no less than the predetermined thickness. Furthermore, in order to ensure the flatness of the outer surface, the slot may be filled with another non-shielding material from the outer surface side. This non-shielding material may be the same as the foregoing non-shielding material.

In the method for manufacturing the housing according to the present disclosure, the slot having the depth less than the thickness of the cover body is defined by cutting the inner surface of the cover body along a specified route. Therefore, the slot does not penetrates through the cover body, and the thickness between the bottom of the slot and the outer surface of the cover body renders the slot robust, such that the slot is not readily deformed due to great pressure when the slot is filled with non-shielding material, thereby improving the appearance unity of the housing.

According to another aspect of the present disclosure, another method for manufacturing a housing is provided.

Figure 5:
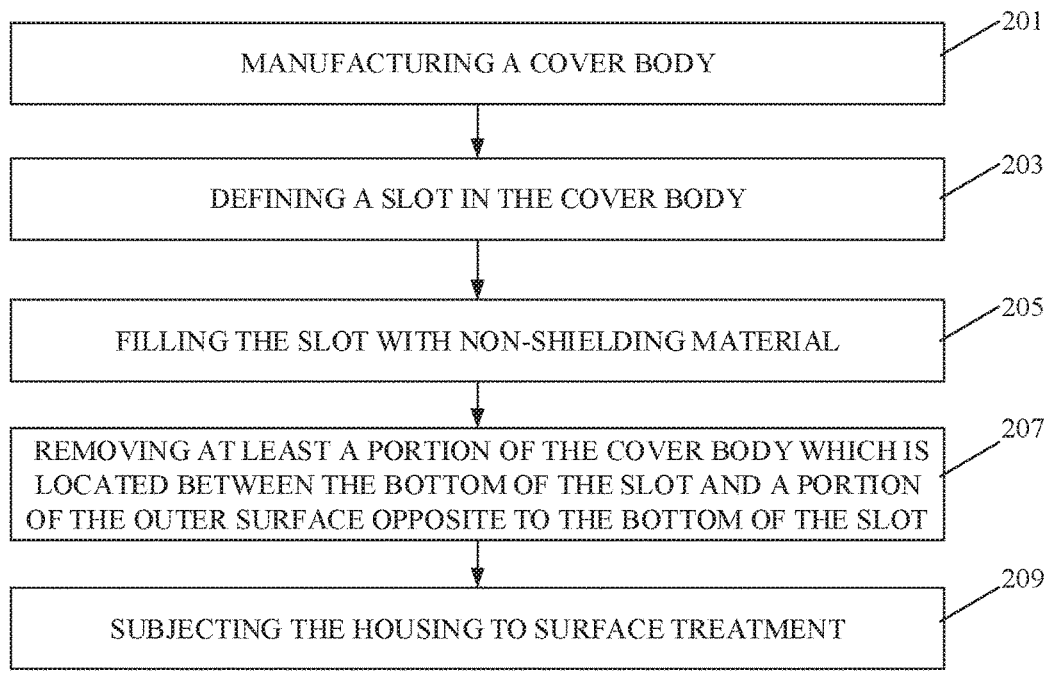
FIG. 5 is a flowchart of another method for manufacturing a housing according to an implementation of the present disclosure.

FIG. 5 illustrates a flowchart of another method for manufacturing a housing according to an implementation of the present disclosure. The housing may serve as a back cover of a mobile terminal. As illustrated in FIG. 5, the method according to the implementation of the present disclosure may begin at block 201.

At block 201: a cover body is manufactured. The cover body is made of shielding material.

In one implementation of the present disclosure, the cover body may be made according to actual requirements. The cover body includes a back plate and four side walls surrounding the back plate. Two of the four side walls are a pair of oppositely disposed long side walls, while the other two are a pair of oppositely disposed short side walls. The four side walls are mainly used for being connected to a front cover of the mobile terminal. The cover body has a first surface facing the interior of the mobile terminal and a second surface disposed oppositely to the first surface. The second surface is exposed outside and can be directly touched by a user. For convenient description, the first surface is referred to as an inner surface, while the second surface is referred to as an outer surface. Naturally, in other implementations, the cover body may include a back plate with snaps disposed on the periphery of the back plate, such that the back plate can be connected to the front cover of the mobile terminal by a snap-fit.

It will be appreciated that material forming the cover body may be metal. In one implementation of the present disclosure, the material of the cover body is aluminum or aluminum alloy which facilitates shaping the cover body.

Figure 6:
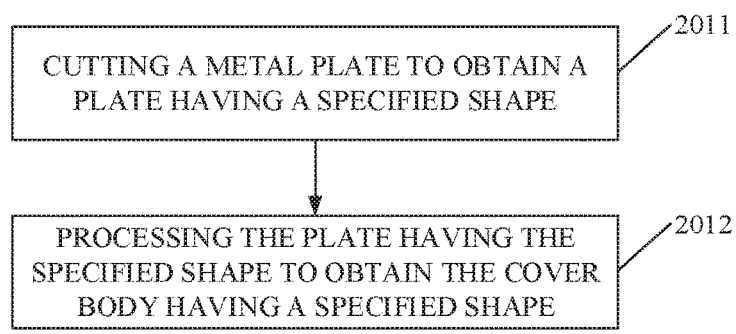
FIG. 6 is a flowchart of manufacturing a cover body.

FIG. 6 is a flowchart of manufacturing the cover body. As illustrated in FIG. 6, the flowchart of manufacturing the cover body may begin at block 2011.

At block 2011: a metal plate is cut to obtain a plate having a specified shape.

In one implementation of the present disclosure, a large plate made of aluminum is cut by a cutting tool, so as to obtain the plate having the specified shape.

At block 2012: the plate having the specified shape is processed to obtain the cover body having a specified shape.

In one implementation of the present disclosure, the plate having the specified shape is processed with a CNC lathe, so as to obtain the cover body having the specified shape.

In one implementation of the present disclosure, the plate having the specified shape is placed into a mold, and is pressed. It will be appreciated that the plate having the specified shape may be pressed once or many times. Then the plate having the specified shape is processed with the CNC lathe, so as to obtain the cover body having the specified shape.

As illustrated in FIG. 5, at block 203: a slot is defined in the cover body.

In one implementation of the present disclosure, the slot is defined in the cover body by cutting the inner surface of the cover body along a specified route. The slot has a depth less than the whole thickness of the cover body, and thus does not penetrates through the cover body. That is to say, the slot has an opening in the inner surface and a bottom opposite to the opening. The opening of the slot is at the inner surface and is used for receiving non-shielding material subsequently, while the bottom renders the slot robust, such that the slot is not readily deformed during subsequent filling to ensure the appearance unity of the housing.

It will be appreciated that the specified route corresponds to the desired shape of the slot. For example, if the slot is straight, the corresponding specified route is also straight; if the slot is curved, the corresponding specified route is also curved. It will also be appreciated that the slot in this implementation has a rectangular cross-section.

It will be appreciated that the specified route extends from one side wall to another opposite side wall via the back plate, i.e. the slot is located in the two opposite side walls and the back plate. In one implementation of the present disclosure, the slot is defined in the two long side walls and the back plate. Naturally, in other implementations, the specified route extends from one side of the back plate to the other side of the back plate, i.e. the slot is merely defined in the back plate and does not extend to the side walls located on the sides of the back plate.

It will be appreciated that the number of the slots is not limited, and may be one or more. Correspondingly, the number of the specified routes is also the same as the number of the slots. In one implementation, the number of the slots is three, and the three slots are arranged along the longitudinal direction of the cover body, and the distances between two adjacent slots are the same, i.e., the three slots are arranged in the cover body with uniform gaps therebetween.

Figure 7:
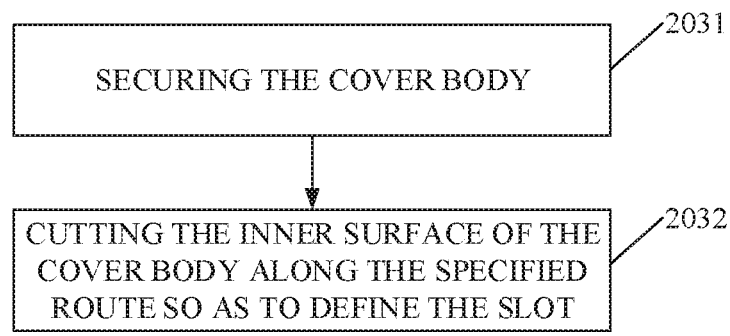
FIG. 7 is a flowchart of defining a slot in the cover body.

FIG. 7 is a flowchart of defining the slot in the cover body. As illustrated in FIG. 7, the flowchart of defining the slot in the cover body may begin at block 2031.

At block 2031: the cover body is secured.

At block 2032: the inner surface of the cover body is cut along the specified route so as to define the slot.

In one implementation of the present disclosure, the cover body is secured to the CNC lathe by means of screwing or pressing by a cylinder. In one implementation of the present disclosure, the cover body is vertical when it is secured to the CNC lathe, that is to say, the back plate of the cover body is perpendicular to the platform of the CNC lathe. Since the slot is located in the two opposite side walls and the back plate of the cover body, the inner surface of the cover body is cut from one side wall to the other opposite side wall via the back plate by a T-shaped tool. The T-shaped tool is used to ensure that the slot is defined without stopping, thereby reducing machining time. Naturally, in other implementations, the inner surface of the cover body is cut three times by a common tool, so as to define the slot. At first, one side wall is cut to define a portion of the slot located therein, then the back plate is cut to define another portion of the slot located therein, and finally another opposite side wall is cut to define the remaining portion of the slot located therein.

It will be appreciated that the slot has a width tolerance ranged from −0.3 mm to 0.3 mm, which facilitates radiation of radio frequency signals from an antenna.

As illustrated in FIG. 5, at block 205: the slot is filled with non-shielding material.

In one implementation of the present disclosure, the non-shielding material may be the material allowing the radio frequency signals from the antenna to pass therethrough.

Figure 8:
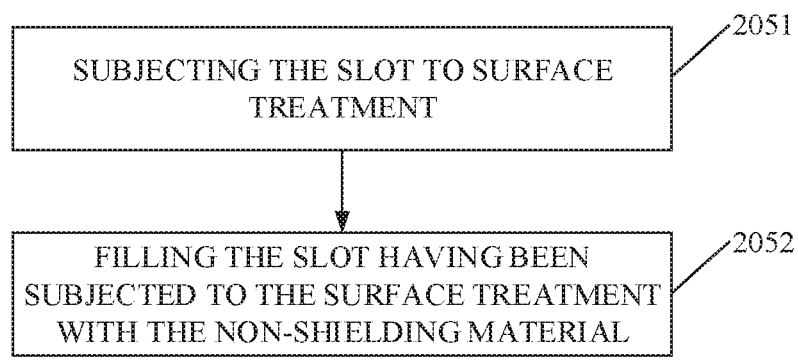
FIG. 8 is a flowchart of filling the slot with non-shielding material.

FIG. 8 is a flowchart of filling the slot with the non-shielding material. As illustrated in FIG. 8, the flowchart of filling the slot with the non-shielding material may begin at block 2051.

At block 2051: the slot is subjected to surface treatment.

At block 2052: the slot having been subjected to the surface treatment is filled with the non-shielding material.

In one implementation of the present disclosure, when the cover body is made of aluminum or aluminum alloy, the slot in the cover body may be subjected to a T-process, such that the inner side, including the bottom, of the slot can be readily combined with the non-shielding material subsequently. In this case, the non-shielding material may be plastic and the slot is then filled by injecting the plastic. Naturally, in other implementations, the non-shielding material may be gel and the slot is filled with gel by a dispenser. Naturally, in some implementations, the non-shielding material may be a mixture of the plastic and the gel.

As illustrated in FIG. 1, at block 207: at least a portion of the cover body which is located between the bottom of the slot and a portion of the outer surface opposite to the bottom of the slot is removed.

Since the slot does not penetrate through the cover body at this time, the bottom of the slot is still metallic and disadvantageous to the radio frequency signals from the antenna passing through the cover body. Hence, the cover body is cut by a predetermined thickness starting from the second surface. The predetermined thickness is less than the whole thickness of the cover body, but the sum of the depth of the slot and the predetermined thickness is greater than or equal to the whole thickness of the cover body such that the slot penetrates through the cover body in the thickness direction of the cover body, and only the non-shielding material is received in the slot, which facilitates the radio frequency signals from the antenna passing therethrough.

It will be appreciated that, the cover body may be cut by the predetermined thickness starting from the second surface by means of milling, such that the slot penetrates through the cover body. In one implementation of the present disclosure, the bottom of the slot is closer to the outer surface of the cover body, and the cover body is cut by the predetermined thickness starting from the second surface by means of milling until the bottom of the slot becomes another opening, i.e., the slot penetrates through the cover body. Naturally, in other implementations, the cover body may be cut by the predetermined thickness by means of laser engraving such that the slot penetrates through the cover body.

Naturally, in other implementations, only a portion of the outer surface opposite to the slot may be cut, and a cutting depth is no less than the predetermined thickness. Furthermore, in order to ensure the flatness of the outer surface, the slot may be filled with another non-shielding material from the outer surface side. This non-shielding material may be the same as the foregoing non-shielding material.

As illustrated in FIG. 5, at block 209: the housing is subjected to surface treatment.

In one implementation of the present disclosure, the housing is subjected to the surface treatment to further improve the appearance unity of the housing. The surface treatment may include at least one selected from a group consisting of polishing treatment, sandblasting treatment, and oxidizing treatment.

In the method for manufacturing the housing according to the present disclosure, the slot having the depth less than the thickness of the cover body is defined by cutting the inner surface of the cover body along a specified route. Therefore, the slot does not penetrates through the cover body, and the thickness between the bottom of the slot and the outer surface of the cover body renders the slot robust, such that the slot is not readily deformed due to great pressure when the slot is filled with non-shielding material, thereby improving the appearance unity of the housing.

In the method for manufacturing the housing according to the present disclosure, the housing is further subjected to the surface treatment, thereby further improving the appearance unity of the housing.

According to another aspect of the present disclosure, a mobile terminal having a housing is provided.

Figure 9:
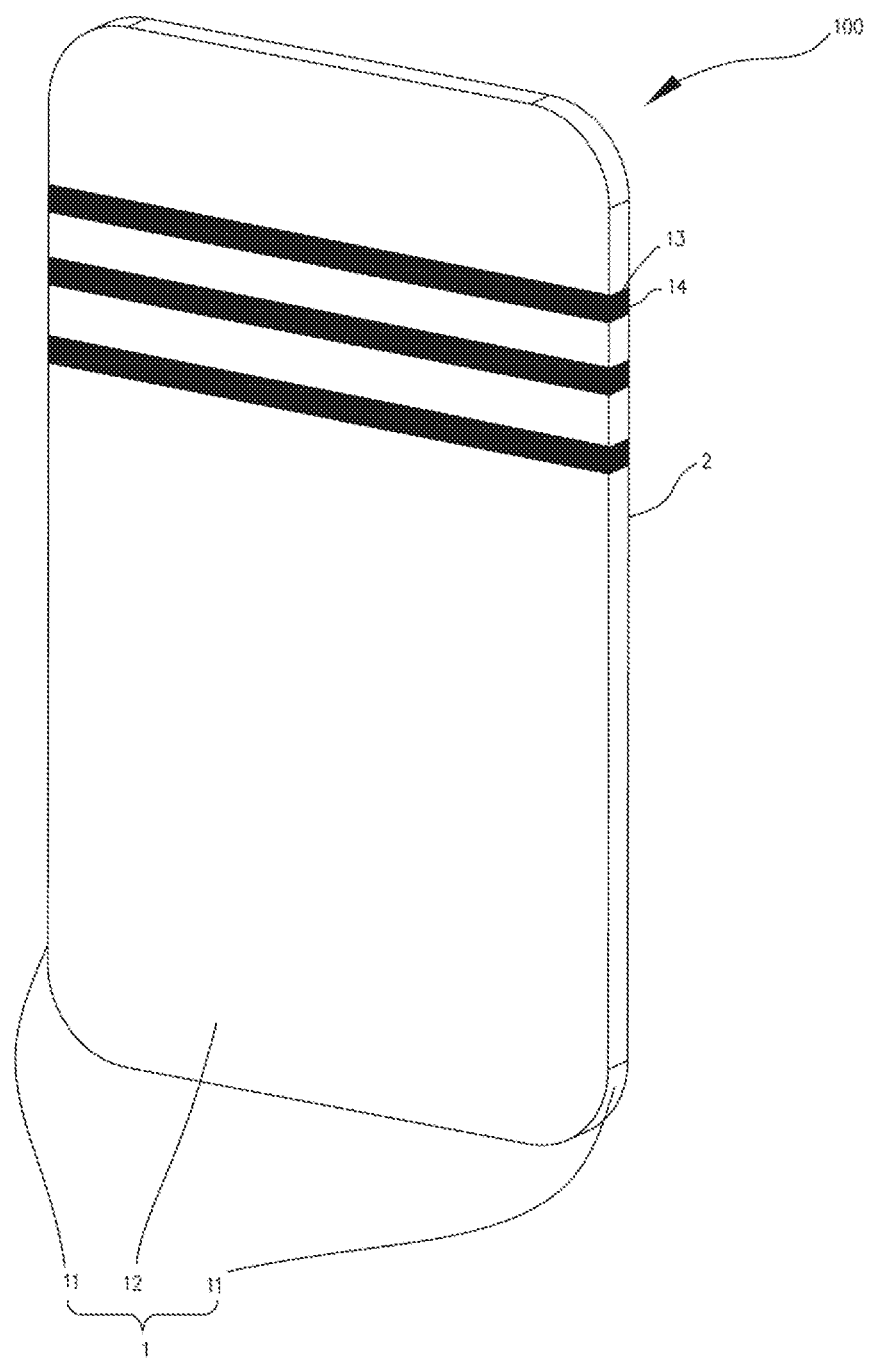
FIG. 9 is a schematic diagram of a mobile terminal according to an implementation of the present disclosure.

FIG. 9 is a schematic diagram of a mobile terminal according to an implementation of the present disclosure. The mobile terminal includes a housing. It should be noted that the housing as illustrated may be manufactured according to the methods in the implementations as illustrated in FIGS. 1 to 8 of the present disclosure. For convenient description, only parts related to the implementation of the present disclosure are illustrated, and details not disclosed will be known from the implementations as illustrated in FIGS. 1 to 8 of the present disclosure.

Referring to FIG. 9, a mobile terminal 100 includes a housing 1 manufactured according to the methods in the implementations as illustrated in FIGS. 1 to 8 and a front cover 2. The mobile terminal 100 according to the implementation of the present disclosure can be any device having communication function and storage function, such as a tablet, a mobile phone, an electronic reader, a remote controller, a personal computer (PC), a notebook computer, an on-board device, a network TV, a wearable device, and so forth. It will be appreciated that the front cover 2 is used for disposing a touch screen and the housing 1 is a back cover of the mobile terminal 100 having an antenna. The housing 1 is connected with the front cover 2 so as to form a shell of the mobile terminal 100.

In the implementation, the housing 1 includes a cover body made of shielding material and at least one slot 13 penetrating through the cover body in the thickness direction of the cover body.

The cover body includes a back plate 12 and four side walls 11 surrounding the back plate 12. The four side walls 11 are mainly used for being connected to the front cover 2 of the mobile terminal 100.

The at least one slot 13 is aligned with the antenna, and is filled with non-shielding material 14 and arranged with uniform gaps therebetween.

It will be appreciated that material forming the cover body may be metal. In one implementation of the present disclosure, the material of the cover body is aluminum or aluminum alloy which facilitates shaping the cover body.

Figure 10:
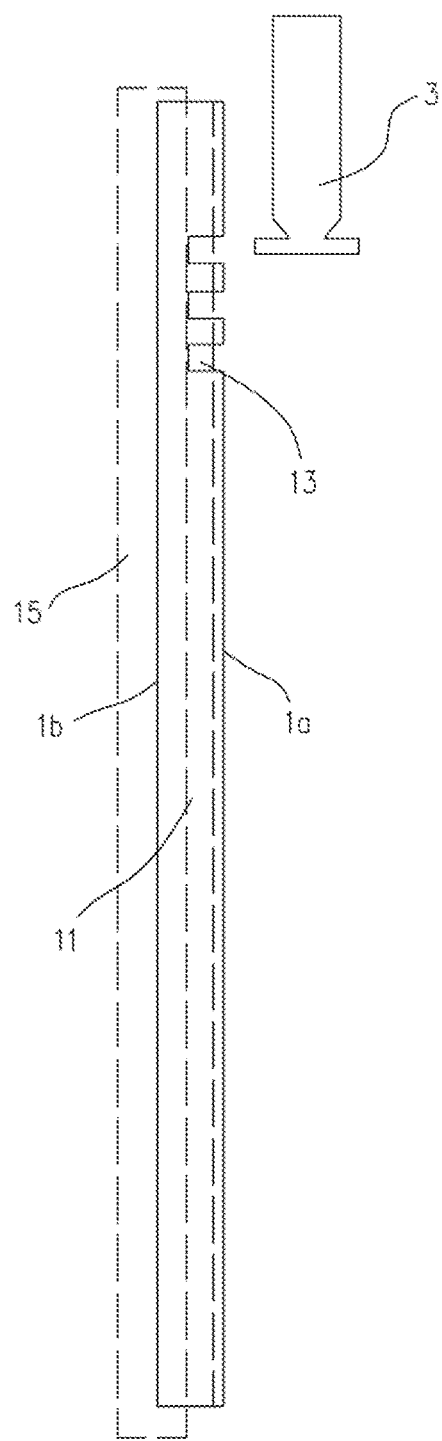
FIG. 10 is a schematic diagram of a housing having a slot not penetrating therethrough.
Figure 11:
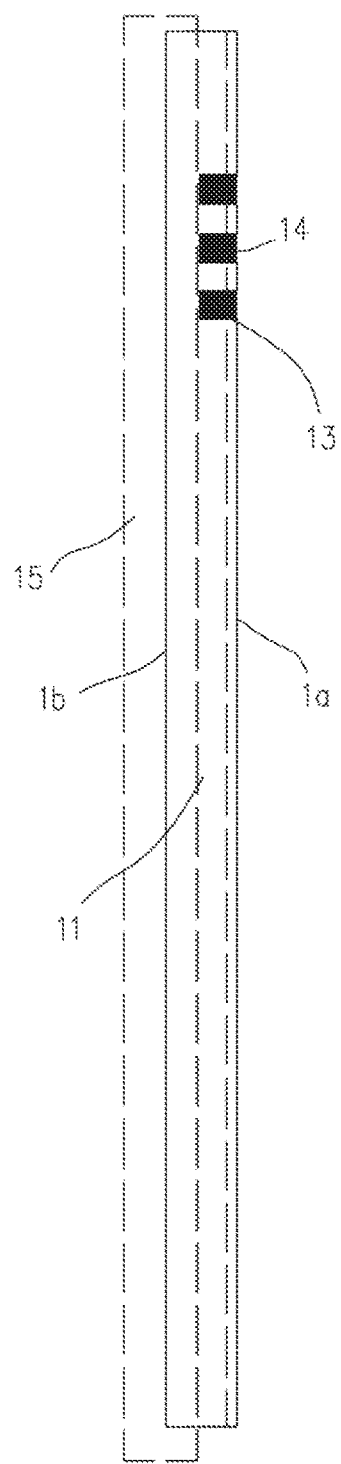
FIG. 11 is a schematic diagram of the housing having the slot filled with non-shielding material.

In one implementation of the present disclosure, the slot 13 penetrates through the cover body, and is filled with the non-shielding material 14. The non-shielding material 14 may be plastic or gel. The methods for manufacturing the slot 13 may be known from FIGS. 1 to 8. In one implementation, as illustrated in FIG. 10, the slot 13 is defined by cutting an inner surface 1*a* of the cover body along a specified route by a T-shaped tool 3, and at this time, the slot 13 does not penetrate through the housing. Then, as illustrated in FIG. 11, the slot 13 is filled with the non-shielding material 14.

Figure 12:
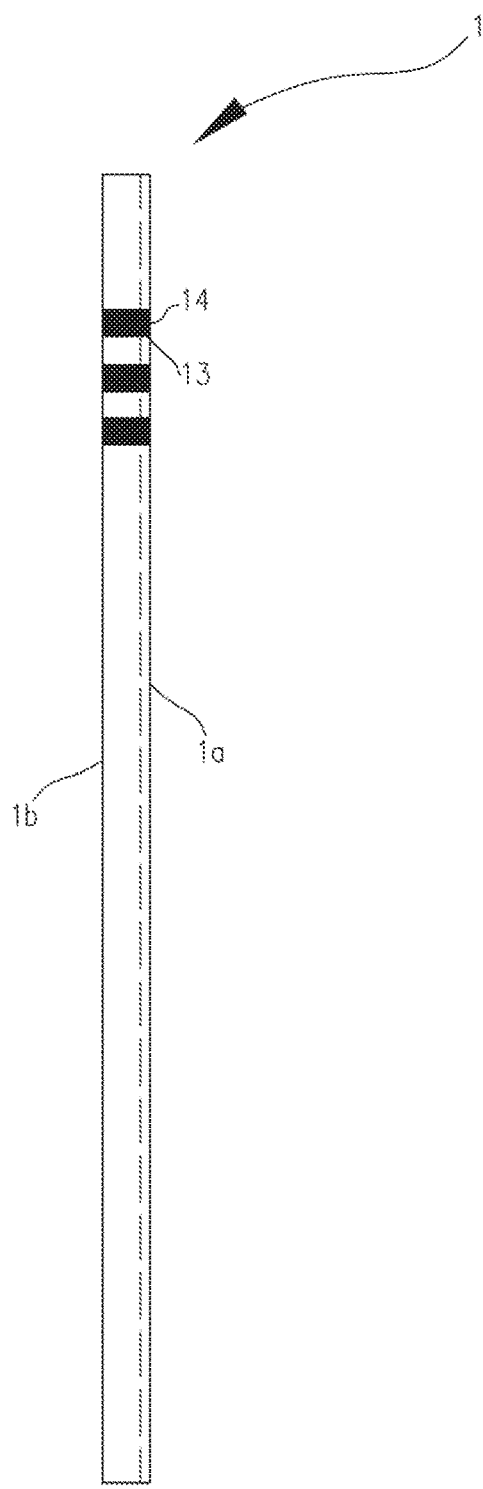
FIG. 12 is a schematic diagram of the housing having a decreased thickness.

In one implementation, the cover body is cut by a predetermined thickness 15 starting from an outer surface 1*b*, and at this time, as illustrated in FIG. 12, the slot 13 penetrates through the cover body.

Figure 14:
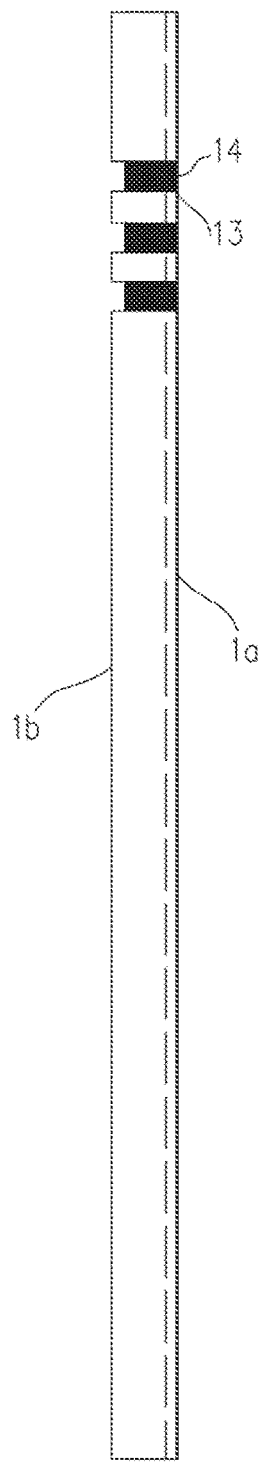
FIG. 14 is a schematic diagram of a housing having a decreased thickness.
Figure 15:
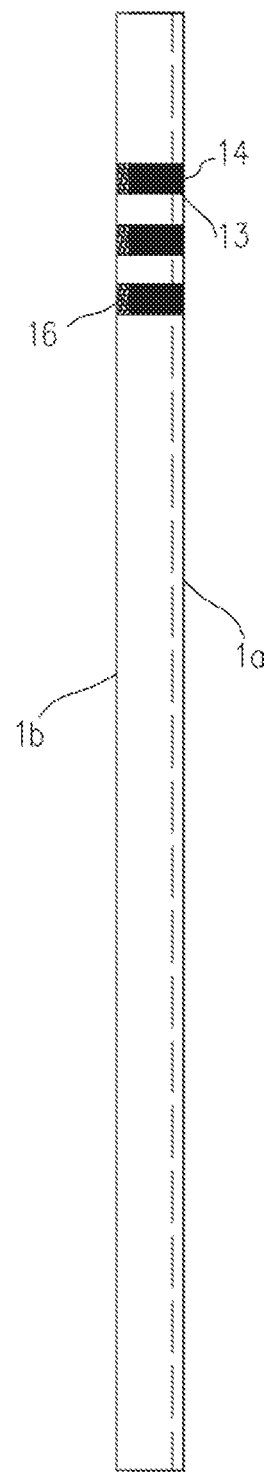
FIG. 15 is a schematic diagram of the housing having a slot filled with second non-shielding material.

In another implementation, only a portion of the outer surface 1*b* opposite to the at least one slot 13 may be cut, and a cutting depth is no less than the predetermined thickness. At this time, the housing 1 is as illustrated in FIG. 14. Furthermore, in order to ensure the flatness of the outer surface 1*b*, as illustrated in FIG. 15, the at least one slot 13 may be further filled with non-shielding material 16 from the outer surface 1b side. The non-shielding material 16 is adjacent to the non-shielding material 14 in the thickness direction of the cover body, and may be the same as the non-shielding material 14.

It will be appreciated that the number of the slots 13 is not limited, and may be one or more. In the implementation, the number of the slots 13 is three, and the three slots 13 are arranged along the longitudinal direction of the cover body, and the distances between two adjacent slots 13 are the same, i.e., the three slots 13 are arranged in the cover body with uniform gaps therebetween.

In one implementation, as illustrated in FIG. 9, the at least one slot 13 extends from one side wall 11 to another opposite side wall 11 via the back plate 12. It will be appreciated that a portion of the slot 13 which is located in the side wall 11 extends from the connection position between the side wall 11 and the back plate 12.

Figure 13:
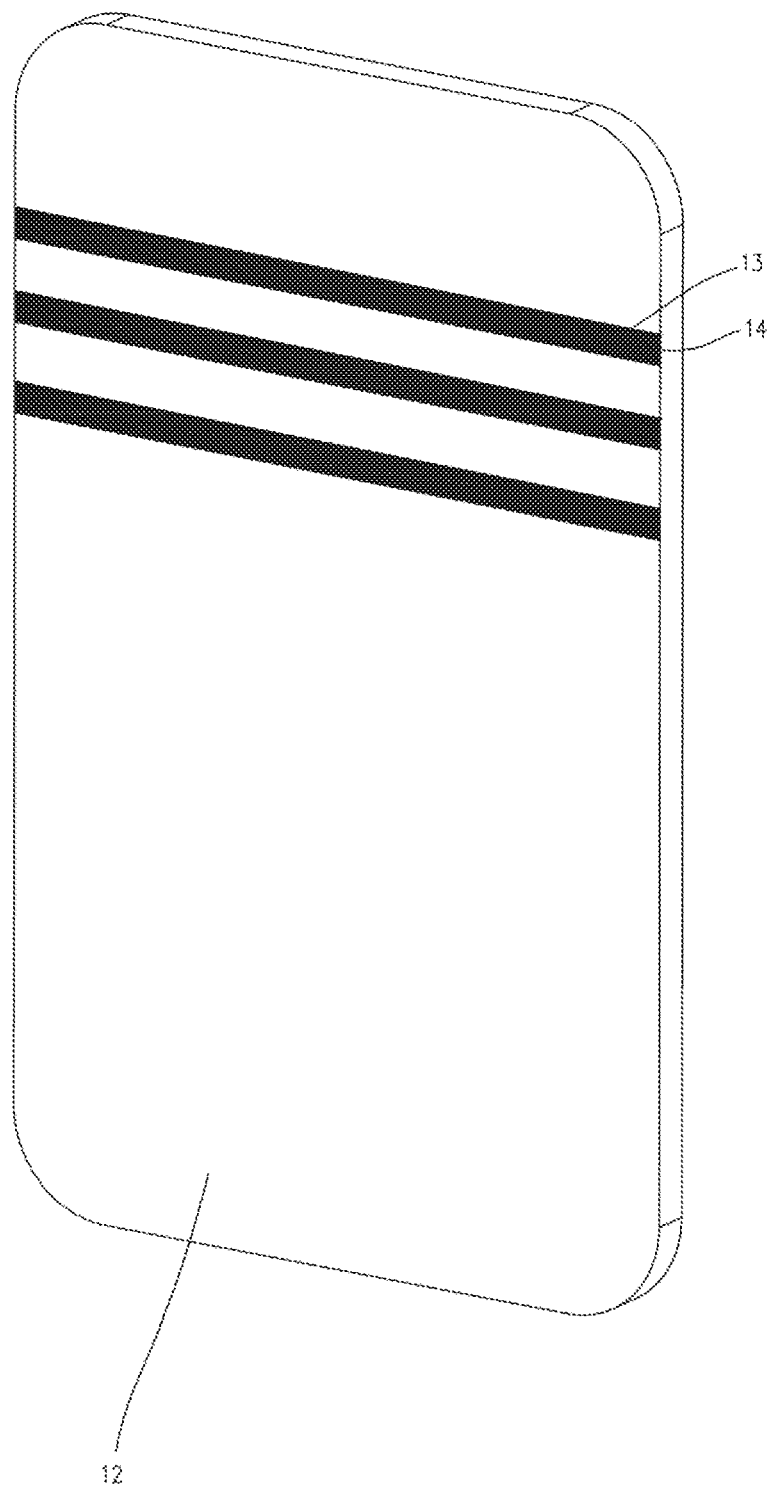
FIG. 13 is a schematic diagram of another mobile terminal according to an implementation of the present disclosure.

In another implementation, referring to FIG. 13, the at least one slot 13 extends from one side of the back plate 12 to the other side of the back plate 12.

The housing 1 as well as the mobile terminal 100 can have the slot 13 not readily deformed, by means of the method for manufacturing the housing 1 according to the present disclosure, thereby ensuring the appearance unity of the housing 1.

The foregoing is the implementations of the present disclosure. It should be noted that, several improvements and modifications can be made by persons skilled in the art without departing from the principles of the present disclosure, and these improvements and modifications also fall within the protection scope of the present disclosure.

What is claimed is:

1. A method for manufacturing a housing, comprising:
   manufacturing a cover body, wherein the cover body is made of a shielding material and has a first surface and a second surface opposite to the first surface;
   defining at least one slot in the cover body, wherein the at least one slot has a depth less than a thickness of the cover body and has an opening in the first surface and a bottom opposite to the opening;
   filling the at least one slot with a first non-shielding material; and
   removing at least one portion of the cover body which is located between the bottom of the at least one slot and a portion of the second surface opposite to the bottom of the at least one slot, such that the at least one slot penetrates through the cover body in a thickness direction of the cover body.

2. The method of claim 1, wherein manufacturing the cover body comprises:
   cutting a metal plate to obtain a plate having a specified shape; and
   processing the plate having the specified shape to obtain the cover body having the specified shape.

3. The method of claim 1, wherein defining the at least one slot in the cover body comprises:
   cutting the first surface of the cover body along a specified route to define the at least one slot.

4. The method of claim 3, wherein the cover body comprises a back plate and two opposite side walls, and the specified route extends from one of the two opposite side walls to the other of the two opposite side walls via the back plate.

5. The method of claim 3, wherein the cover body comprises a back plate, and the specified route extends from one side of the back plate to the other side of the back plate.

6. The method of claim 1, wherein filling the at least one slot with the first non-shielding material comprises:
   subjecting the at least one slot to surface treatment; and
   filling the at least one slot having been subjected to the surface treatment with the first non-shielding material.

7. The method of claim 6, wherein the first non-shielding material comprises at least one selected from the group consisting of plastic and gel.

8. The method of claim 1, wherein removing the at least one portion of the cover body which is located between the bottom of the at least one slot and the portion of the second surface opposite to the bottom of the at least one slot comprises:
   cutting the cover body by a predetermined thickness starting from the second surface, wherein the predetermined thickness is less than the thickness of the cover body, and a sum of the depth of the at least one slot and the predetermined thickness is greater than or equal to the thickness of the cover body.

9. The method of claim 1, further comprising:
   filling the at least one slot with a second non-shielding material from the second surface after removing the at least one portion of the cover body which is located between the bottom of the at least one slot and the portion of the second surface opposite to the bottom of the at least one slot.

10. The method of claim 9, wherein the second non-shielding material is the same as the first non-shielding material.

11. The method of claim 1, further comprising:
    subjecting the housing to surface treatment after removing the at least one portion of the cover body which is located between the bottom of the at least one slot and the portion of the second surface opposite to the bottom of the at least one slot.

12. The method of claim 1, wherein the shielding material comprises metal.

* * * * *